United States Patent
Chen et al.

(10) Patent No.: US 12,400,096 B2
(45) Date of Patent: Aug. 26, 2025

(54) IMAGE-BASED BARCODE DETECTION

(71) Applicant: ZEBRA TECHNOLOGIES CORPORATION, Lincolnshire, IL (US)

(72) Inventors: Dongqing Chen, East Setauket, NY (US); Kui Liu, Irvine, CA (US); Neeharika Nelaturu, Holtsville, NY (US); David S. Koch, East Islip, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/224,893

(22) Filed: Jul. 21, 2023

(65) Prior Publication Data

US 2025/0028918 A1   Jan. 23, 2025

(51) Int. Cl.
   *G06K 7/14*   (2006.01)

(52) U.S. Cl.
   CPC ......... *G06K 7/1443* (2013.01); *G06K 7/1413* (2013.01); *G06K 7/1417* (2013.01); *G06K 7/1469* (2013.01); *G06K 7/1482* (2013.01)

(58) Field of Classification Search
   CPC .. G06K 7/1443; G06K 7/1413; G06K 7/1417; G06K 7/1469
   USPC .................................................. 235/462.08
   See application file for complete search history.

(56) References Cited

U.S. PATENT DOCUMENTS

| | | | | |
|---|---|---|---|---|
| 5,304,787 A | * | 4/1994 | Wang | G06K 7/1093 235/494 |
| 5,436,439 A | * | 7/1995 | Nishimura | G06K 7/10861 235/440 |
| 5,512,739 A | * | 4/1996 | Chandler | G06K 7/1443 235/470 |
| 10,346,660 B2 | * | 7/2019 | Santi | G06K 19/06028 |
| 2022/0100980 A1 | * | 3/2022 | Simpson | G06T 7/13 |
| 2024/0028847 A1 | * | 1/2024 | Muller | G06K 7/1443 |

OTHER PUBLICATIONS

International Search Report and Written Opinion for International Application No. PCT/US24/38535 mailed on Aug. 9, 2024, 6 pages.

* cited by examiner

*Primary Examiner* — Ahshik Kim

(57) ABSTRACT

A method includes: capturing an image; partitioning the image into sub-images; for each sub-image: providing the sub-image to a detection model, receiving, from the detection model, one or more sub-image regions of interest (SROIs), each SROI defined by (i) a position of the SROI, and (ii) one of a set of symbology categories, each symbology category encompassing a plurality of barcode symbologies; generating one or more regions of interest (ROI) from the SROIs, each ROI defined by a position of the ROI in the image, and a symbology category; and providing the ROIs to a decoder.

12 Claims, 7 Drawing Sheets

IMAGE-BASED BARCODE DETECTION

BACKGROUND

Images captured by digital image sensors can be used to detect and decode barcodes. Detecting and decoding barcodes from an image with a field of view that encompasses multiple barcodes, e.g., displayed on objects on a shelf or the like, may be complicated by the limited portion of the image representing each barcode. Capturing such an image at a higher resolution may improve detection and decoding accuracy, but may also increase the computational burden of detection and decoding.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention and explain various principles and advantages of those embodiments.

Figure 1:
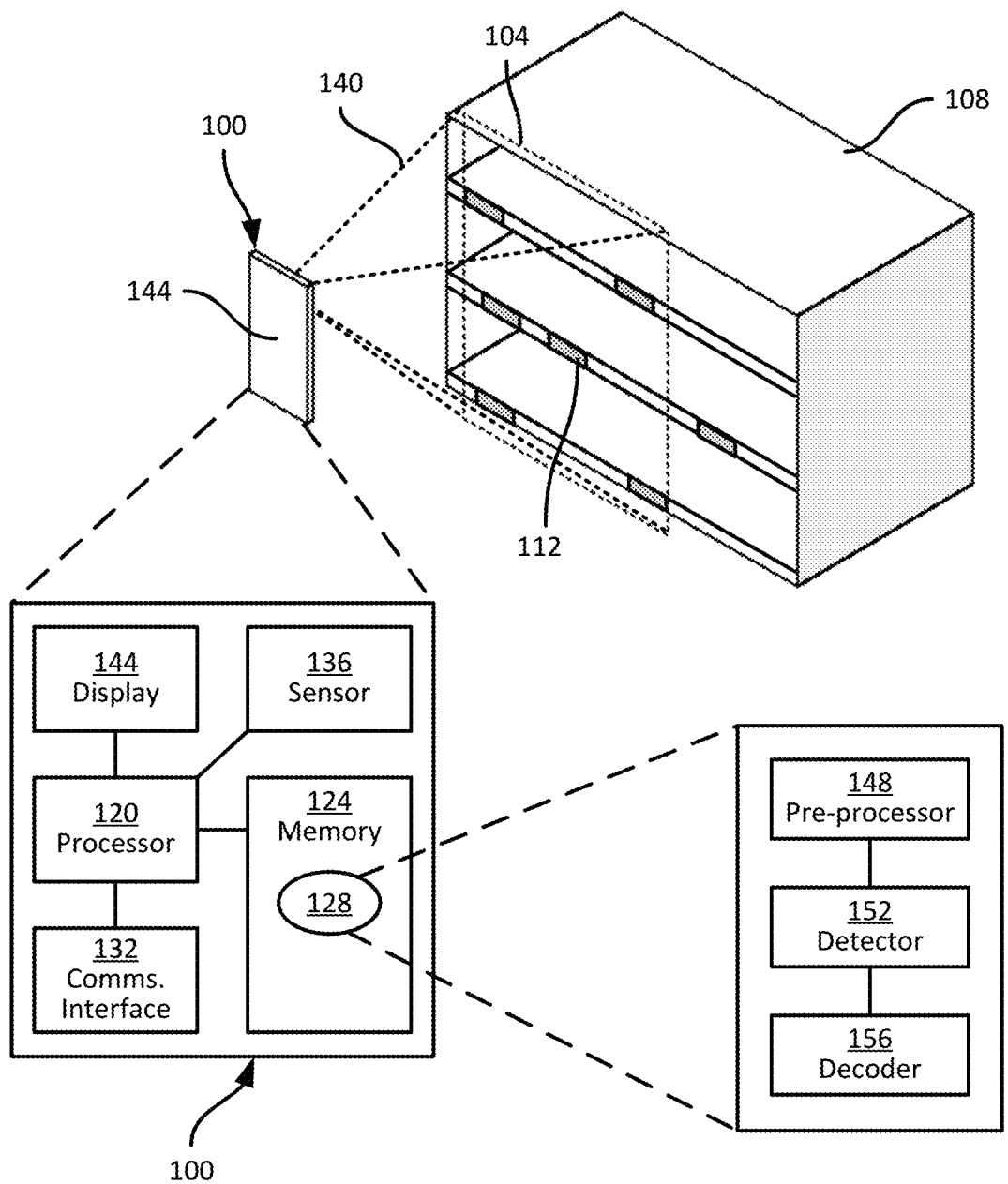
FIG. 1 is a diagram of a computing device for image-based barcode detection.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method including: capturing an image; partitioning the image into sub-images; for each sub-image: providing the sub-image to a detection model, receiving, from the detection model, one or more sub-image regions of interest (SROIs), each SROI defined by (i) a position of the SROI, and (ii) one of a set of symbology categories, each symbology category encompassing a plurality of barcode symbologies; generating one or more regions of interest (ROI) from the SROIs, each ROI defined by a position of the ROI in the image, and a symbology category; and providing the ROIs to a decoder.

Additional examples disclosed herein are directed to a computing device, comprising: an image sensor; and a processor configured to: capture an image via the image sensor; partition the image into sub-images; for each sub-image: provide the sub-image to a detection model, receive, from the detection model, one or more sub-image regions of interest (SROIs), each SROI defined by (i) a position of the SROI, and (ii) one of a set of symbology categories, each symbology category encompassing a plurality of barcode symbologies; generate one or more regions of interest (ROI) from the SROIs, each ROI defined by a position of the ROI in the image, and a symbology category; and provide the ROIs to a decoder.

FIG. 1 illustrates a computing device 100, such as a mobile computer, a smart phone, a barcode scanner, or the like. The device 100 includes a housing supporting various components of the device 100, discussed below. The device 100 can be operated to capture images, and is configured to detect barcodes within such images, and under certain conditions, to decode the detected barcodes. In the discussion below, the term "barcode" includes symbols using one-dimensional symbologies that encode data horizontally (e.g., UPC-A, Code 128, and the like), and symbols with two-dimensional symbologies (e.g., Data Matrix, QR Code, DotCode, and the like).

For example, the device 100 can be operated to capture an image representing a region 104 of a shelf or other support structure 108 that supports one or more barcodes 112 (illustrated as grey boxes in FIG. 1). In the illustrated example, the support structure 108 includes shelves, and the barcodes 112 are disposed on shelf edges, e.g., facing into an aisle of a facility in which the device 100 is deployed. A wide variety of other objects, or collections of objects, can carry the barcodes 112 in other examples. For example, the barcodes 112 can be affixed to packages in a sorting facility, on products on the support structure 108, or the like.

The region 104 of the support structure 108 contains six barcodes 112 in the illustrated example. In a single image depicting the region 104, each barcode 112 may occupy only a small portion of the image. For example, in the illustrated example each barcode 112 may occupy only about two percent of the area of the region 104. At certain image resolutions (e.g., images having pixel counts lower than about one megapixel, or 1 MP), an image depicting a relatively large field of view (FOV) such as that encompassing the region 104 may yield inaccurate or incomplete barcode detection and/or decoding results, as a result of the small number of pixels representing each barcode 112.

The accuracy of the detection and decoding process may be improved, for example, by capturing images with greater resolution (e.g., with a pixel count greater than about 10 MP). However, larger images also impose a greater computational burden on the device 100. Under some conditions, e.g., when the device 100 is a mobile computer or handheld barcode scanner, the computational load associated with detecting and decoding barcodes 112 in a large image (e.g., an image with a pixel count greater than about 10 MP) may introduce delays to the detection and decoding process (e.g., delays greater than about five seconds) sufficient to impede downstream processes, such as product picking, package transport, or the like. The device 100 therefore implements certain functionality, discussed below, to mitigate the performance impact of using large images for barcode detection and decoding.

Certain internal components of the device 100 are shown in FIG. 1. The device 100 includes a processor 120, such as a central processing unit (CPU), graphics processing unit (GPU), application-specific integrated circuit (ASIC), or the like. The processor 120 is communicatively coupled with a non-transitory computer-readable storage medium such as a memory 124, e.g., a combination of volatile memory elements (e.g., random access memory (RAM)) and non-volatile memory elements (e.g., flash memory or the like). The memory 124 stores a plurality of computer-readable instructions in the form of applications, including in the illustrated example a barcode detection application 128, whose execution by the processor 120 configures the device 100 to process the images to detect and/or decode barcodes 112 therein.

The device 100 can also include a communications interface 132, enabling the device 100 to communicate with other computing devices (not shown) via any suitable communications links. The device 100 further includes a sensor 136, such as a camera or other suitable image sensor, configured to capture images representing a portion of the surroundings of the device 100 within a FOV 140 of the sensor 136. As discussed below, execution of the application 128 configures the processor 120 to process such images to detect and/or decode barcodes 112 in the images captured by the sensor 136. The device 100 can also include one or more output devices, such as a display 144, a speaker (not shown), or the like. In other examples, the display 144 can be omitted, e.g., in the case of a barcode scanner with a ring form factor. The device 100 can further include one or more input devices, such as a microphone, a touch screen (e.g., integrated with the display 144), a keypad, a scan trigger, or the like.

The device 100 implements, for example via the application 128, an image pre-processor 148 configured to process images captured via the sensor 136, e.g., to partition the images into sub-images as described below. The device 100 also implements a detector 152 configured to process the sub-images produced by the pre-processor 148 to detect regions of interest therein containing barcodes, and a detector 152 configured to process the regions of interest from the detector 152 to decode the barcodes contained in the regions of interest. In the illustrated example, the pre-processor 148, the detector 152, and the decoder 156 are implemented by the processor 120 via execution of the application 128. In other examples, however, one or more of the pre-processor 148, the detector 152, and the decoder 156 can be implemented in distinct hardware elements, via separate applications, and the like. For example, the processor 120 can implement the pre-processor 148 and the detector 152, e.g., via execution of the application 128, and the device 100 can include an additional controller or other processing hardware implementing the decoder 156, such as a scan engine. In further examples, the processor 120 can implement the detector 152 and the decoder 156 via execution of the application 128, while the pre-processor 148 can be implemented via an additional controller or other processing hardware, e.g., integrated with the sensor 136. In still further examples, the pre-processor 148 and the decoder 156 can be implemented by the processor 120, while the detector 152 is implemented by a separate controller.

Figure 2:
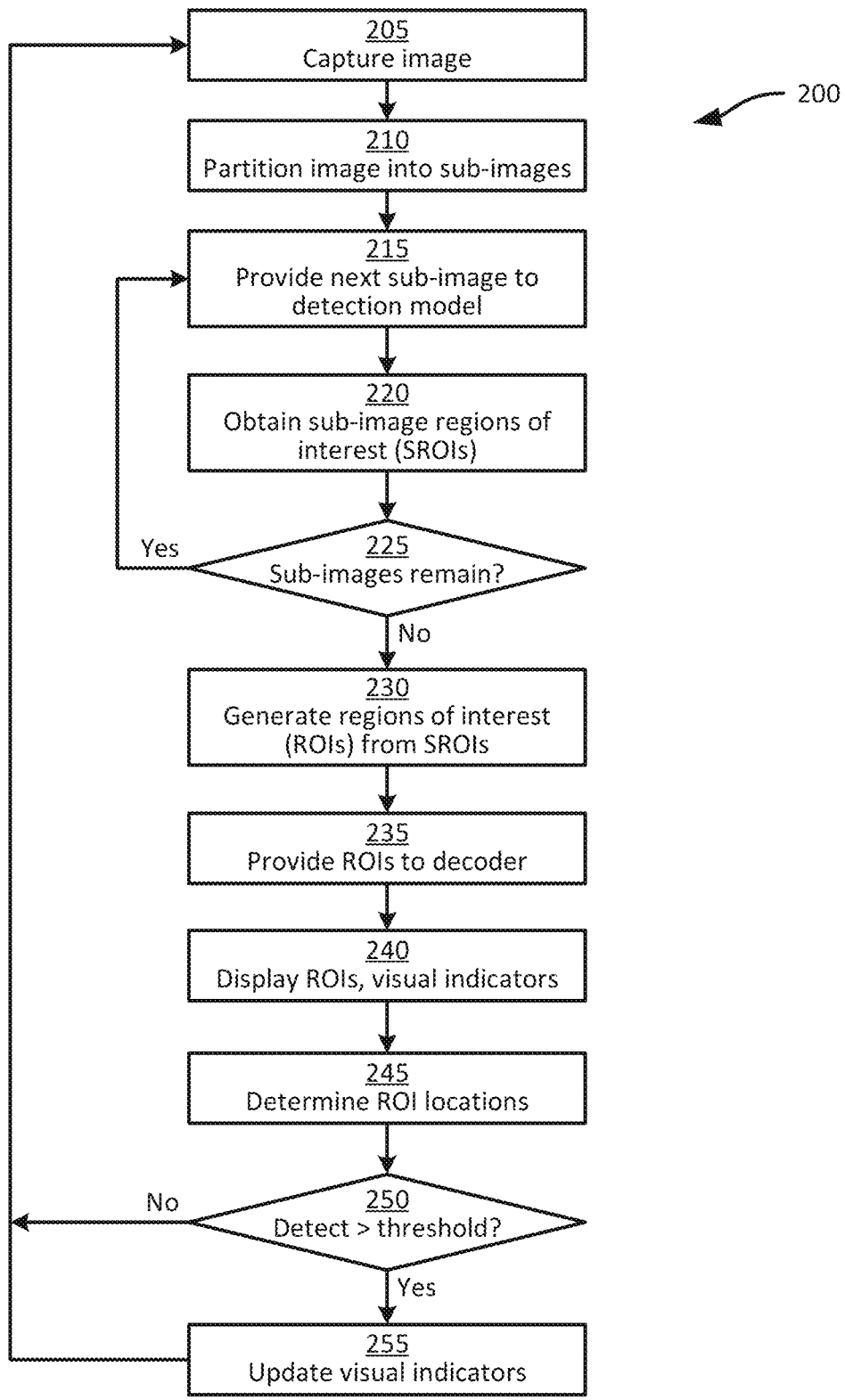
FIG. 2 is a flowchart of a method of image-based barcode detection.

Turning to FIG. 2, a method 200 of detecting and decoding barcodes in images is illustrated. The method 200 is described below in conjunction with its performance at the device 100, e.g., via execution of the application 128 by the processor 120.

At block 205, the device 100 is configured to capture an image, corresponding to a portion of the surroundings of the device 100 within the FOV 140 of the sensor 136. For example, the device 100 can be operated to capture an image of as portion of the support structure 108 as shown in FIG. 1. A wide variety of objects may be positioned in the FOV 140 when the image is captured, in addition to or instead of the support structure 108. The device 100 can capture the image at block 205 in response to activation of an input (e.g., a trigger, a button, or the like). In other examples, the device 100 can be configured to capture a sequence of images, e.g., a video stream. Following initiation of the video stream capture, e.g., via an input as set out above, each image is captured automatically, without further input activation, at a suitable capture frequency (e.g., ten frames per second, although lower and higher frame rates are also contemplated).

At block 210, the device 100 is configured to partition the image captured at block 205 into a plurality of sub-images. The sub-images, as discussed below, are processed independently to detect barcodes or portions of barcodes therein, and the detection results are subsequently combined to represent barcode detections for the initial image from block 205. Independently processing the sub-images can reduce the computational load of detecting barcodes in the initial image. That is, the computational burden associated with partitioning the image, processing each sub-image, and combining the results of such processing, can be smaller than the computational burden associated with performing detection on the initial image as a whole, facilitating the use of high-resolution images for real-time or near real-time barcode detection (e.g., completing detection over the whole initial image within about five seconds).

Partitioning the image into sub-images can be performed using various mechanisms. For example, the device 100 can be configured to maintain a predetermined target sub-image size (e.g., expressed as a pixel count). The target size can be defined in the application 128, as a configuration setting, or the like. The device 100 can compare the target size to the size of the image from block 205, and determine a number of sub-images into which to partition the image such that each sub-image has a size equal to or smaller than the target. For example, for an initial image with a 16 MP pixel count, and a target sub-image size of 1 MP, the device 100 can determine that the image is to be partitioned into sixteen equally-sized sub-images.

The device 100 can further determine the dimensions (e.g., a width and a height, measured in pixels) of each sub-image, based on the size of the initial image and the number of sub-images. For example, the device 100 can factorize the number of sub-images, e.g., yielding one or more pairs of factors. The device 100 can then select the pair of factors with the smallest difference between the pair. For example, if the number of sub-images is sixteen, the factors [4, 4] may be selected rather than the factors [8, 2]. The dimensions of the initial image can then be divided by the selected factors. Various other mechanisms for determine the number and size of the sub-images can also be employed. For example, the sensor 136 may operate at a fixed resolution, and the device 100 can maintain a fixed number of sub-images, as well as fixed dimensions for the sub-images, determined prior to performance of the method 200 and stored as configuration data.

Figure 3:
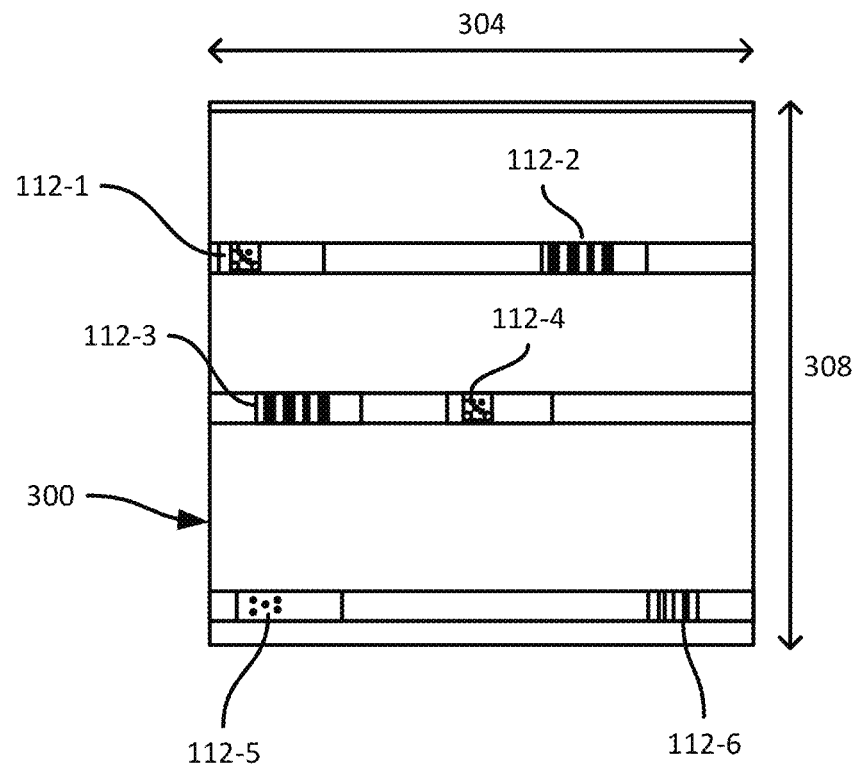
FIG. 3 is a diagram illustrating an example performance of blocks 205 and 210 of the method of FIG. 2.
Figure 3:
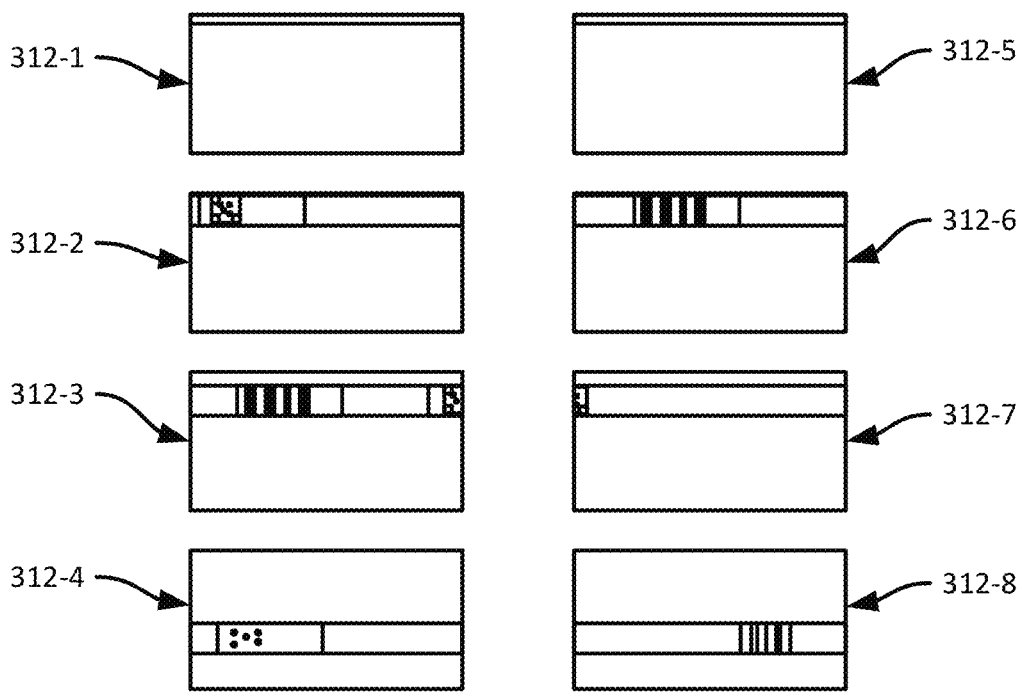

Turning to FIG. 3, an example performance of blocks 205 and 210 of the method 200 is illustrated. At block 205, the device 100 is configured to capture, via the sensor 136, an image 300 of the support structure 108, depicting barcodes 112-1, 112-2, 112-3, 112-4, 112-5, and 112-6 (collectively referred to herein as the barcodes 112, and generically referred to as a barcode 112; similar nomenclature is also used herein for other components with suffixed reference numbers). As will be apparent from FIG. 3, the barcodes 112 use different symbologies. For example, the barcodes 112-1, 112-4, and 112-5 use two-dimensional symbologies, while the barcodes 112-2, 112-3, and 112-6 use one-dimensional symbologies.

The image 300 has a size defined by a width 304 and a height 308, e.g., in pixels. The width 304 and height 308 can be defined by the resolution of the sensor 136. To determine the number of sub-images into which the image 300 is to be partitioned, the device 100 can divide the pixel count (e.g., the width 304 times the height 308) by a target sub-image pixel count, e.g., rounding up to the nearest integer. In some examples, the device 100 can be configured to round the result of the above division up to the nearest even integer, to avoid determining a prime number of sub-images.

In the present example, the target pixel count is about one eighth of the pixel count of the image 300. For example, the size of the image 300 can be about 16 MP, and the target pixel count can be about 2 MP. A wide variety of other image sizes and target sub-image sizes are contemplated. In this example, the device 100 therefore determines at block 210 that the image 300 is to be partitioned into eight sub-images of equal size. The device 100 can further determine the dimensions (e.g., width and height) of each sub-image by factorizing the sub-image count, and selecting the closest pair of factors. The pairs of factors in this example are [1, 8] and [2, 4], and the device 100 can therefore be configured to select the latter pair, and to partition the image 300 into an array two sub-images wide and four sub-images high. Eight sub-images 312-1, 312-2, 312-3, 312-4, 312-5, 312-6, 312-7, and 312-8 are shown in FIG. 3. Each sub-image 312 has a width equal to one half of the width 304, and a height equal to one quarter of the height 308. The positions of the sub-images 312 relative to the image 300 are stored, such that positions of barcodes derived from the sub-images can be mapped to positions within the image 300. The above partitioning operations can divide an arbitrarily sized initial image into a suitable number of sub-images, according to a target sub-image size.

Returning to FIG. 2, at block 215 the device 100 is configured to provide the sub-images independently to a detection model, such as a convolutional neural network or other suitable model. In some examples, the detection model can be based on a version of the You Only Look Once (YOLO) model, e.g., YOLO v5. The model can be trained, prior to performance of the method 200, to detect barcodes in input images, and to output the position of each detected barcode in the input image, as well as a class of the detected barcode. The class indicates a symbology category. For example, the model can be trained to assign one of a 2D category (indicating that the detected barcode uses a two-dimensional symbology) and a 1D category (indicating that the detected barcode uses a one-dimensional symbology). In other examples, additional categories can be implemented, including categories encompassing a single symbology. For example, in some embodiments the model can assign to each detected barcode one of the 2D category, the 1D category, and a DotCode category indicating that the detected barcode uses the DotCode symbology specifically.

As will be apparent, the model can be trained by providing a set of labelled input images, with each input image annotated with the positions of barcodes in the image and symbology categories for the barcodes. The training image set can also include partial barcodes, to facilitate detection of partial barcodes in the sub-images from block 210, as discussed below.

At block 215, the device 100 is configured to select a sub-image 312 that has not yet been provided to the model, and to provide the sub-image 312 to the model. At block 220, the device 100 is configured to obtain, as output from the model, zero or more sub-image regions of interest (SROIs). Each SROI indicates that the model detected a barcode or partial barcode, and is defined by a position within the sub-image and a symbology category. The position can be expressed, for example, as the pixel coordinates of a top-left corner of the SROI, as well as a height and width of the SROI (also in pixels). The position defining an SROI can take various other forms, including for example the pixel coordinates of opposing corners (e.g., top-left and bottom-right corners), pixel coordinates of all four corners of the SROI, or the like.

In the present example, the model is implemented at the device 100, e.g., as a component of the application 128. For example, the trained model can be deployed to the device 100 prior to performance of the method 200 using a suitable software library, such as TensorFlow. In some examples, the device 100 can be configured to transmit the sub-images to another computing device for processing, e.g., via the communications interface 132. The other computing device can implement the model, and return the detection results to the device 100.

At block 225, having obtained detection results from the model for a sub-image 312, the device 100 is configured to determine whether any sub-images 312 remain to be processed via the model. When the determination at block 225 is affirmative, the device 100 repeats block 215 with the next sub-image, until each of the sub-images 312 has been provided to the model. When the determination at block 225 is negative, indicating that all the sub-images generated at block 210 have been processed via the model, performance of the method 200 proceeds to block 230.

Figure 4:
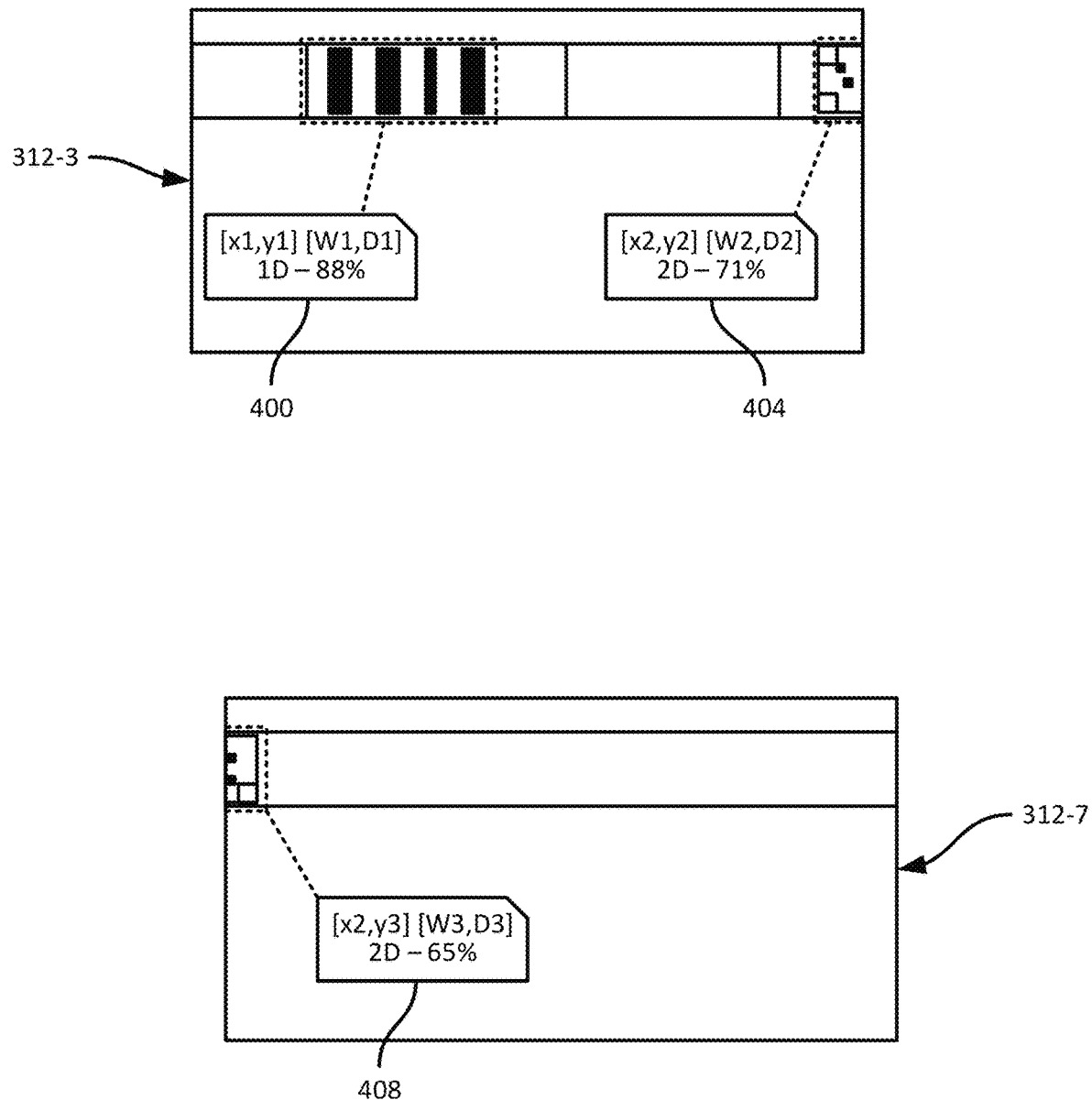
FIG. 4 is a diagram illustrating example performances of blocks 215 and 215 of the method of FIG. 2.

FIG. 4 illustrates example performances of block 220 for the sub-images 312-3 and 312-7. In particular, by processing the sub-image 312-3 via the detection model, the device 100 obtains two SROIs 400 and 404. The SROI 400 corresponds to the barcode 112-3, and the SROI 404 corresponds to a portion of the barcode 112-4 (which was divided between the images 312-3 and 312-7, as seen in FIG. 3). Further, by processing the sub-image 312-7 via the detection model, the device 100 obtains another SROI 408, corresponding to another portion of the barcode 112-4. Each SROI is defined by a position, e.g., expressed as the coordinates of a top-left corner of a bounding box (x1, y1, etc.) and dimensions (e.g., W1, D1, etc.). Each SROI is further defined by a symbology category (e.g., 1D or 2D), which can be associated with a confidence level indicating a probability that the symbology category was correctly detected. In some examples, SROIs with confidence levels below a threshold (e.g., 50% or any other suitable predetermined threshold) can be discarded.

Returning to FIG. 2, at block 230 the device 100 is configured to generate regions of interest (ROIs) from the SROIs obtained via successive performances of blocks 215 and 220 (one performance of blocks 215 and 220 per sub-image generated at block 210). Each ROI is defined by a position of the ROI within the image 300 (e.g., corner coordinates and pixel dimensions), as well as a symbology category. To generate the ROIs at block 230, the device 100 can be configured to determine whether any of the SROIs are contiguous. For an SROI that is not contiguous with any other SROIs, the device 100 converts the position defining the SROI, which corresponds to a position in a sub-image 312, to a position in the image 300. For an SROI that is contiguous with one or more other SROIs, the device 100 is configured to merge the contiguous SROIs to generate an ROI, as discussed below in connection with FIG. 5.

Figure 5:
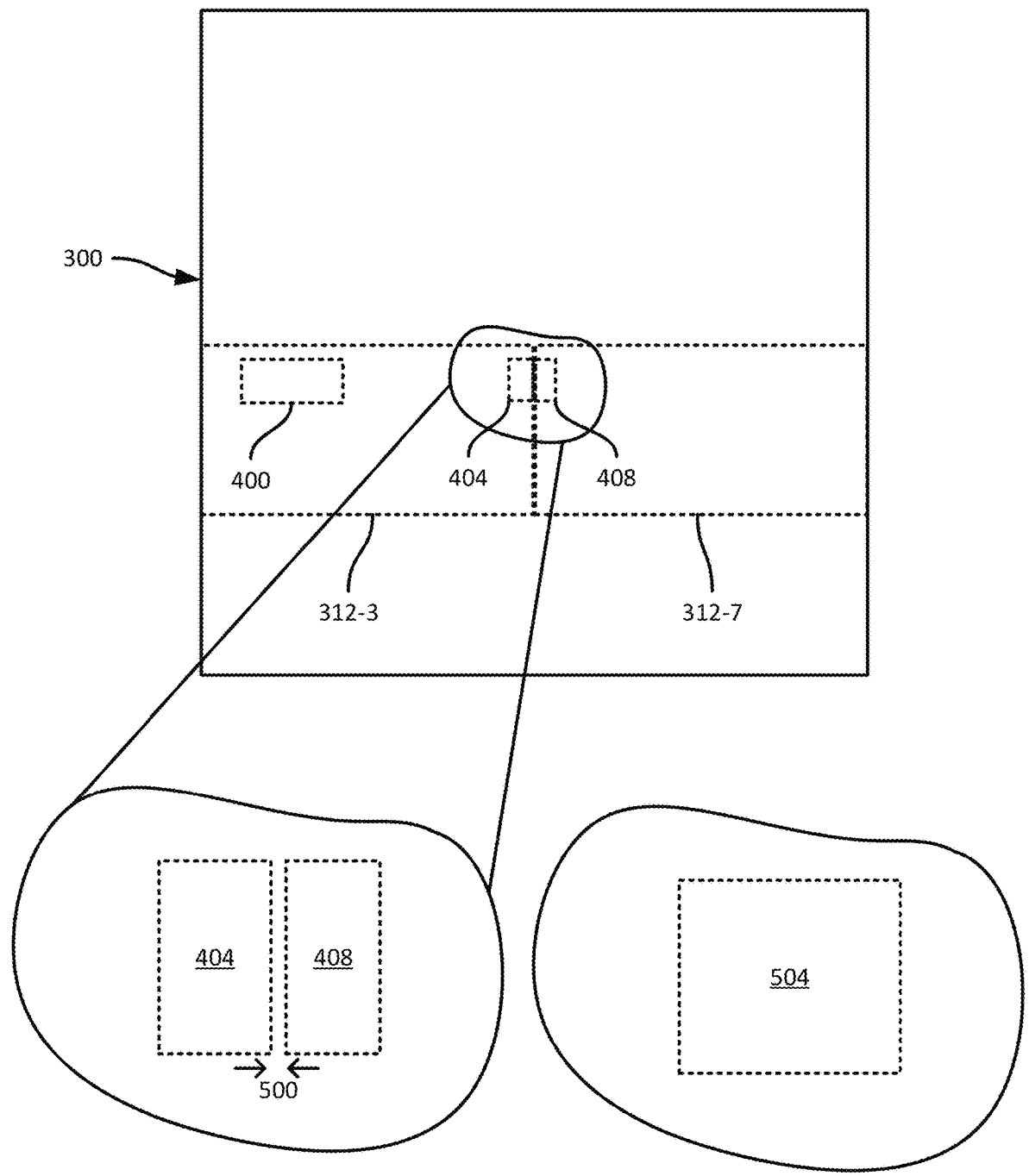
FIG. 5 is a diagram illustrating an example performance of block 230 of the method of FIG. 2.

Referring to FIG. 5, the SROIs shown in FIG. 4 are shown superimposed on the boundaries of the image 300. The positions of the sub-images 312 within the image 300 are maintained, as noted earlier, and a position within a given sub-image 312 can therefore be converted to a position within the image 300. To determine whether any SROIs are contiguous, the device 100 can be configured to determine a distance between a pair of SROIs (e.g., the shortest distance between the pair of SROIs), such as a distance 500 between the SROIs 404 and 408, shown in the lower-left detail view of FIG. 5. When the distance 500 is below a predetermined threshold (e.g., a number of pixels, a fraction of a width or height of either of the SROIs, or the like), the SROIs 404 and 408 are considered contiguous.

When a pair of SROIs is considered contiguous, the device 100 is configured to generate an ROI by merging the contiguous SROIs. Merging SROIs can be implemented by, for example, extending the width of one SROI of the pair to encompass the width of the other SROI, and extending the height of the one SROI to encompass the height of the other SROI. FIG. 5 illustrates an ROI 504 resulting from the merger of the SROIs 404 and 408. The merged ROI 504 can include the same symbology category as the contributing SROIs. In some examples, SROIs are only considered contiguous if they are sufficiently close to one another and also have matching symbology categories. The merging process set out above can be repeated until no further mergers are performed. In some examples, more than two SROIs can therefore contribute to one ROI. Merged ROIs such as the ROI 504 can result from SROIs that are side by side, as shown in FIG. 5, or arranged vertically relative to one another, or a combination thereof.

Returning to FIG. 2, at block 235 the device 100 is configured to provide the ROIs from block 230 to a decoder, e.g., implemented via the application 128, or as a separate application at the device 100. The decoder can include an executable process, dedicated hardware, or the like, configured to determine the symbology of a barcode and decode data from the barcode based on the determined symbology. The output of the decoder can include, for example, a decoded string and a confidence level, or an indication that decoding was not successful (e.g., some barcodes 112 may be represented in sufficient detail in the image 300 to be detected but not decoded).

Providing an ROI to the decoder includes providing the image 300 and the position of the ROI, and/or an extracted portion of the image 300 corresponding to the position of the ROI. Providing an ROI to the decoder also includes providing the symbology category associated with the ROI. The symbology category facilitates the determination of a specific symbology for the ROI by the decoder, by reducing the number of candidate symbologies to attempt. For example, an ROI provided to the decoder with the "2D" symbology category allows the decoder to ignore one-dimensional symbologies in searching for the symbology of the ROI, and attempt to decode the ROI using each two-dimensional symbology.

At block 240, having provided each of the ROIs (in sequence, or in parallel, according to the capabilities of the decoder), the device 100 is configured to obtain decode results, and can be configured to display the ROIs along with visual indicators of decode status, based on the decode results. For example, the device 100 can control the display 144 to present the image 300, with each ROI highlighted in a first color, pattern, or the like if the ROI was successfully decoded, or in a second color, pattern, or the like if the ROI was not successfully decoded. The data decoded from each successfully decoded ROI can also be presented on the display 144, in some examples.

Figure 6:
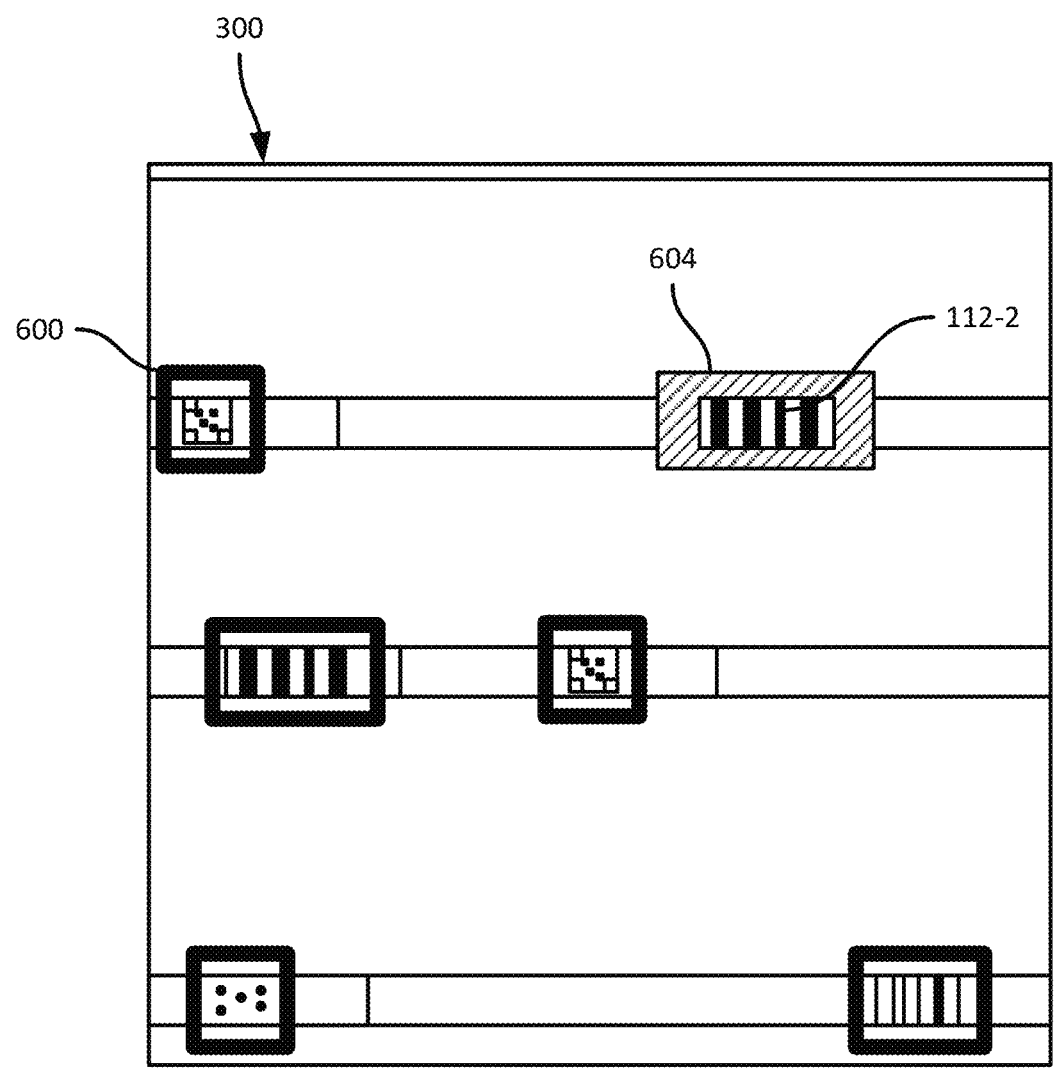
FIG. 6 is a diagram illustrating an example performance of block 240 of the method of FIG. 2.

Turning to FIG. 6, an example performance of block 240 is illustrated, in which the image 300 is presented (e.g., on the display 144, not shown), with visual indicators 600 associated with successfully decoded ROIs, and visual indicators 604 associated with unsuccessfully decoded ROIs. In particular, as shown in FIG. 6, the ROI encompassing the barcode 112-2 was not successfully decoded, and that ROI is therefore presented with a visual indicator 604, visually distinct from the visual indicators 600 associated with the remaining ROIs. The visual indicators 600 and 604 can indicate to an operator of the device 100 which barcodes 112 may require further images (e.g., captured closer to the barcode 112) to decode. The device 100 can also, in some examples, compare any decoded data to a pick list or the like, and present an additional visual indicator in association with ROIs that match the pick list, e.g., to guide the operator to items to be picked from a shelf or the like.

Referring again to FIG. 2, in some examples, the device 100 can return from block 240 to block 205, to capture a further image and repeat the detection and decoding process set out above. In the present example, at block 245, the device 100 can further determine three-dimensional locations of the ROIs presented at block 240, relative to the device 100. For example, the device can include a motion sensor, such as an inertial measurement unit (IMU) or the like, and can employ the motion sensor and/or the image sensor 136 to track a pose (e.g., a position and orientation of the device 100 in three-dimensional space). Pose tracking using motion sensor and/or image data can be implemented using various mechanisms, including ARCore (Google™) or ARKit (Apple™).

Figure 7:
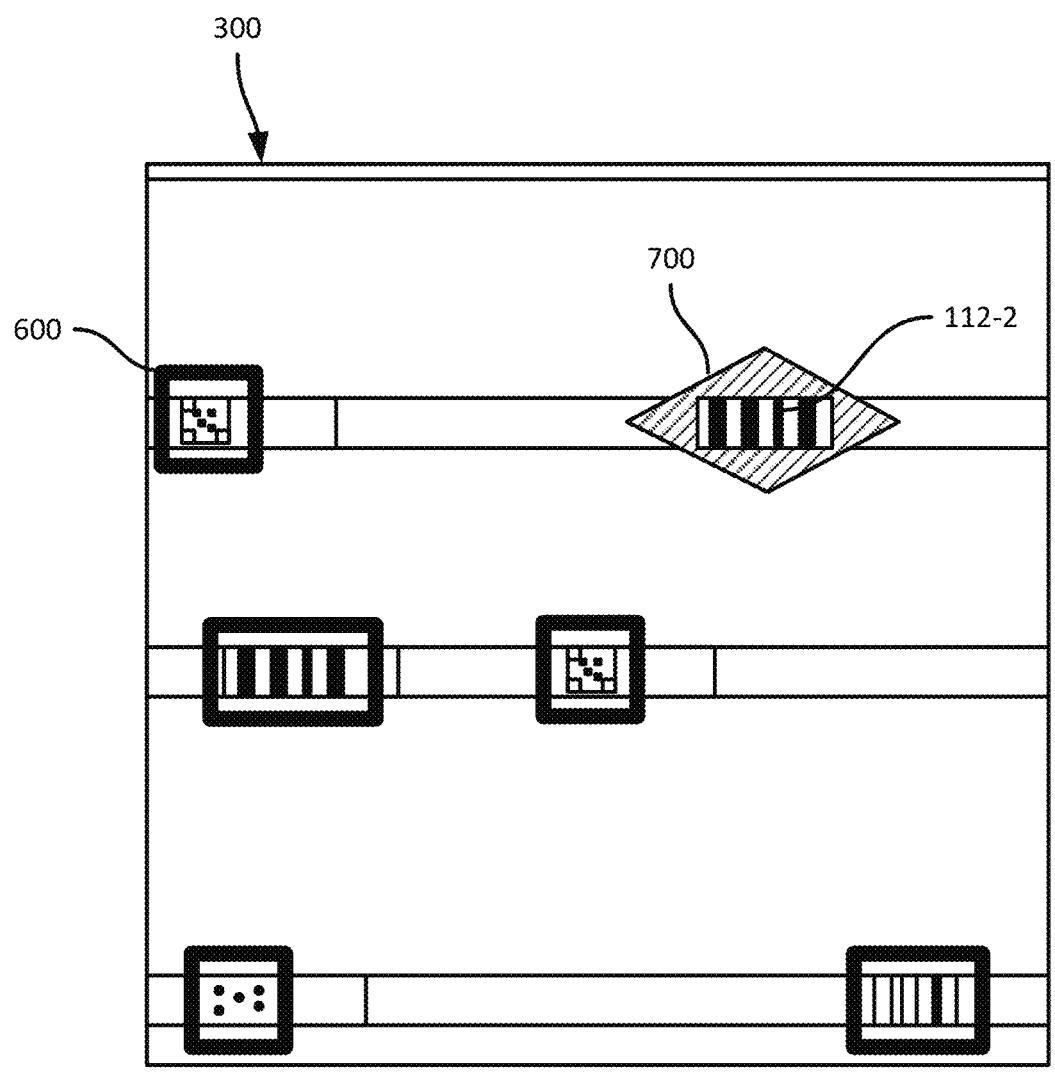
FIG. 7 is a diagram illustrating an example performance of block 255 of the method of FIG. 2.

Based on the pose of the device 100 and the position of an ROI in the image 300, the device 100 can determine a position in three dimensions of the ROI, relative to the device. The device 100 can maintain a count of distinct images in which an ROI has been detected at the same three-dimensional position (e.g., within a threshold distance of the three-dimensional position). At block 250, the device 100 can be configured to determine whether any ROIs have been detected a threshold number of times (e.g., in a threshold number of distinct images), without being successfully decoded. When the determination at block 250 is negative, the device 100 can return to block 205. When the determination at block 250 is affirmative, the device 100 can update the visual indicator associated with the ROI at block 255. The visual indicator can be changed to a third color, for example, and/or to a different shape, size, or the like. Turning to FIG. 7, for example, if the barcode 112-2 is detected a threshold number of times (e.g., in five successive image frames), and has not been decoded, the device 100 can replace the indicator 604 with an indicator 700, to draw attention to the barcode 112-2.

In other examples, the detection functionality discussed above can be applied to other forms of machine readable indicia than barcodes. For example, the device 100 can be configured to detect and categorize indicia such as text (e.g., as part of an optical character recognition (OCR) pipeline). In such examples, the detector 152 can identify sections of text, e.g., paragraphs or the like, and select an indicia category instead of the symbology category mentioned above. The indicia category can correspond to a plurality of languages (e.g., Latin-based languages, Slavic languages, and the like), a plurality of textual fonts, and the like.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Certain expressions may be employed herein to list combinations of elements. Examples of such expressions include: "at least one of A, B, and C"; "one or more of A, B, and C"; "at least one of A, B, or C"; "one or more of A, B, or C". Unless expressly indicated otherwise, the above expressions encompass any combination of A and/or B and/or C.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method, comprising:
    capturing an image;
    partitioning the image into sub-images;
    for a sub-image:
        providing the sub-image to a detector executing a detection model,
        receiving, from the detector, a sub-image region of interest (SROI) defined by (i) a position of the SROI within the sub-image, and (ii) a symbology category encompassing a plurality of barcode symbologies;
    generating a region of interest (ROI) from the SROI by converting the position of the SROI in the sub-image to a position in the image, the ROI defined by the position in the image and the symbology category;
    providing the ROI to a barcode decoder; and
    receiving, from the detector, a further SROI having a position within a further sub-image, wherein:
        generating the ROI from the SROI comprises: identifying SROIs with contiguous positions in the image, and merging the SROIs with contiguous positions.

2. The method of claim 1, further comprising, prior to partitioning the image into the sub-images:
    determining a number of the sub-images based on a target size of the sub-image.

3. The method of claim 2, wherein the target size of the sub-image defines a pixel count; and wherein determining the number of the sub-images comprises:
    dividing a pixel count of the image by the pixel count defined by the target size of the sub-image.

4. The method of claim 1, wherein the symbology category includes one of a first category corresponding to one-dimensional barcodes, and a second category corresponding to two-dimensional barcodes.

5. The method of claim 1, further comprising, at the barcode decoder:
selecting a set of barcode symbologies according to the symbology category corresponding to the ROI;
determining which of the symbologies matches the ROI; and
decoding data from the ROI based on the symbology matching the ROI.

6. The method of claim 5, further comprising:
controlling a display to present the position of the ROI and a visual indicator of a decoding status;
determining a three-dimensional location corresponding to the ROI;
determining, based on the three-dimensional location, that the ROI was detected in a threshold number of previous images and has not been decoded; and
updating the visual indicator associated with the ROI.

7. A computing device, comprising:
an image sensor; and
a image pre-processor configured to:
capture an image via the image sensor;
partition the image into sub-images; and
provide the sub-images to a detector;
a detector configured to, for a sub-image:
execute a detection model to obtain a sub-image region of interest (SROI) defined by (i) a position of the SROI within the sub-image, and (ii) a symbology category encompassing a plurality of barcode symbologies;
generate a region of interest (ROI) from the SROI by converting the position of the SROI in the sub-image to a position in the image, the ROI defined by the position in the image and the symbology category;
provide the ROIs to a barcode decoder;
obtain a further SROI having a position within a further sub-image; and
generate the ROI from the SROI by: identifying SROIs with contiguous positions in the image, and merging the SROIs with contiguous positions.

8. The computing device of claim 7, wherein the image pre-processor is further configured, prior to partitioning the image into the sub-images, to:
determine a number of the sub-images based on a target size of the sub-image.

9. The computing device of claim 8, wherein the target size of the sub-image defines a pixel count; and wherein the image pre-processor is configured to determine the number of the sub-images by:
dividing a pixel count of the image by the pixel count defined by the target size of the sub-image.

10. The computing device of claim 7, wherein the symbology category includes one of a first category corresponding to one-dimensional barcodes, and a second category corresponding to two-dimensional barcodes.

11. The computing device of claim 7, wherein the barcode decoder is configured to:
select a set of barcode symbologies according to the symbology category corresponding to the ROI;
determine which of the symbologies matches the ROI; and
decode data from the ROI based on the symbology matching the ROI.

12. The computing device of claim 11, further comprising a display, wherein the barcode decoder is further configured to:
control the display to present the position of the ROI and a visual indicator of a decoding status;
determine a three-dimensional location corresponding to the ROI;
determine, based on the three-dimensional locations, that the ROI was detected in a threshold number of previous images and has not been decoded; and
update the visual indicator associated with the ROI.

* * * * *